United States Patent
Etkin et al.

(10) Patent No.: US 8,526,816 B2
(45) Date of Patent: Sep. 3, 2013

(54) OPTICAL DATA BUS AND METHOD

(75) Inventors: Raul H. Etkin, San Francisco, CA (US); Erik Ordentlich, San Jose, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,560

(22) PCT Filed: Oct. 29, 2009

(86) PCT No.: PCT/US2009/062654
§ 371 (c)(1),
(2), (4) Date: Sep. 23, 2011

(87) PCT Pub. No.: WO2011/053301
PCT Pub. Date: May 5, 2011

(65) Prior Publication Data
US 2012/0237224 A1    Sep. 20, 2012

(51) Int. Cl.
*H04B 10/00* (2013.01)

(52) U.S. Cl.
USPC ............... 398/60; 398/73; 398/78; 398/89; 398/99

(58) Field of Classification Search
USPC ............ 398/58–60, 66–73, 78, 89, 99
See application file for complete search history.

(56) References Cited

U.S. PATENT DOCUMENTS

| | | | | |
|---|---|---|---|---|
| 4,809,363 A | * | 2/1989 | Thinschmidt et al. | 398/60 |
| 4,850,047 A | * | 7/1989 | Iguchi et al. | 398/60 |
| 5,058,101 A | * | 10/1991 | Albanese et al. | 398/73 |
| 5,220,582 A | * | 6/1993 | Kaharu et al. | 375/282 |
| 5,274,673 A | * | 12/1993 | Kaharu et al. | 375/282 |
| 5,369,516 A | * | 11/1994 | Uchida | 398/60 |
| 6,292,282 B1 | * | 9/2001 | Mossberg et al. | 398/99 |
| 6,366,375 B1 | | 4/2002 | Sakai et al. | |

(Continued)

FOREIGN PATENT DOCUMENTS

| WO | WO-0204989 | 1/2002 |
|---|---|---|
| WO | WO-2009022672 | 2/2009 |

OTHER PUBLICATIONS

Achaleshwar Sahai et al., "On Channel Output Feedback in Deterministic Interference Channels," Proceedings of IEEE Information Theory Workshop, Taormina, Italy, Oct. 2009.

(Continued)

*Primary Examiner* — Agustin Bello (57) ABSTRACT

An optical data bus transceiver (110), optical data bus system (100) and method (300) employ a disambiguation signal to resolve bit ambiguities in a summation signal on an optical data bus (104). The optical data bus transceiver includes a transmitter (112) connected to the optical bus and configured, in conjunction with another transmitter (112', 120), to produce on the optical bus the summation signal during a first interval and the disambiguation signal during a second interval. The optical data bus transceiver further includes a receiver (114) configured to receive (310) the summation signal. The summation signal includes a summation of separate data signals from each of the transceiver transmitter (112) and the other transmitter (112', 120). The disambiguation signal includes information to resolve bit ambiguities in the summation signal. A bit ambiguity results from a summation of data bits in each of the respective data signals during a symbol period of the first interval.

15 Claims, 3 Drawing Sheets

(56) References Cited

U.S. PATENT DOCUMENTS

| | | | |
|---|---|---|---|
| 6,684,030 B1* | 1/2004 | Taylor et al. | 398/59 |
| 6,873,797 B2* | 3/2005 | Chang et al. | 398/51 |
| 7,065,298 B1* | 6/2006 | Munroe et al. | 398/77 |
| 7,330,656 B2* | 2/2008 | Lee et al. | 398/78 |
| 7,860,395 B2* | 12/2010 | Kashima et al. | 398/78 |
| 8,014,675 B2* | 9/2011 | Sarashina et al. | 398/72 |
| 8,050,565 B2* | 11/2011 | Guignard et al. | 398/89 |
| 8,320,761 B2* | 11/2012 | Zheng et al. | 398/67 |
| 8,374,504 B2* | 2/2013 | Mizutani et al. | 398/71 |
| 2002/0178319 A1 | 11/2002 | Sanchez-Olea | |
| 2003/0007218 A1 | 1/2003 | Mahlab | |
| 2007/0196108 A1* | 8/2007 | Tamai et al. | 398/77 |
| 2010/0086304 A1* | 4/2010 | Mizutani et al. | 398/71 |

OTHER PUBLICATIONS

Thomas M. Cover et al., "An Achievable Rate Region for the Multiple-Access Channel with Feedback," IEEE Trans. Information Theory, vol. IT-27, No. 3, May 1981, pp. 292-298.

* cited by examiner

OPTICAL DATA BUS AND METHOD

CROSS-REFERENCE TO RELATED APPLICATIONS

N/A

STATEMENT REGARDING FEDERALLY SPONSORED RESEARCH OR DEVELOPMENT

N/A

BACKGROUND

In many systems, a data bus is used to interconnect and provide communication between modules and various related subsystems of the system. For example, a computer system may employ a data bus to interconnect a processor, memory, a graphics processor and various other peripheral modules and system elements. Communication between the various interconnected modules and system elements on the data bus generally involves a cooperative sharing of a data channel or channels of the data bus such that whenever a given module transmits data, another module or modules are able to receive and decode the transmitted data. In some implementations, the data bus data channels are shared using a time-domain multiplexing scheme such as time division multiple access (TDMA) mode. For example, a TDMA data bus controller may allocate or assign time slots to specific modules, allowing those modules to transmit only during the assigned time slots. By allocating time slots using a TDMA mode, interference between signals transmitted by different modules may be largely avoided. In particular, restricting communication on the data bus to a single module per time slot avoids potential ambiguities in the transmitted data due to signal interference that otherwise would have been caused by multiple modules trying to transmit simultaneously.

Unfortunately, using TDMA modes ultimately may limit a throughput of the data bus in a given time slot to a data rate of the single module allocated to that time slot. When a data bus, such as an optical data bus, has a bandwidth that is higher than that needed by a particular single module, the data bus performance may suffer in terms of ultimate utilization efficiency and throughput. Improved utilization efficiency and throughput may be achieved by increasing the data rate of particular modules on the data bus but that generally leads to much higher component costs associated with such increased data rates. Similarly, complex modulation schemes and various higher order coding methodologies may be employed to increase data bus throughput and utilization in some instances. However, such complex modulation schemes and higher order data coding methodologies for improving data bus throughput and utilization may not be readily implemented in some instances. For example, optical data buses may not be readily adapted to such schemes, especially where component cost is considered a critical factor.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

Certain embodiments of the present invention have other features that are one of in addition to and in lieu of the features illustrated in the above-referenced figures. These and other features of the invention are detailed below with reference to the preceding drawings.

DETAILED DESCRIPTION

Embodiments of the present invention provide a data bus and more particularly, an optical data bus having enhanced throughput. In particular, according to various embodiments of the present invention, a pair of independent, separate data signals are transmitted on the optical data bus as a combination of a summation signal and a disambiguation signal. The summation signal represents a summation of the separate data signals while the disambiguation signal comprises information to resolve bit ambiguities that may be present in the summation signal. Since statistically only a fraction (e.g., about 50%) of symbol periods of the summation signal may actually contain or represent bit ambiguities, a combined length (or total time) of the summation signal and the disambiguation signal is generally less than a total combined length of the separate data signals, if the separate data signals were to be transmitted sequentially on the optical data bus. As a result, overall data throughput rates of the optical data bus may be increased by a factor of about 1.5 or more, according to some embodiments of the present invention. Such an unexpected increase in throughput may facilitate data rate scaling as well as data bus complexity improvements for a variety of optical data bus architectures without a concomitant need for increased performance in optical data bus hardware (e.g., higher data rate capability) and related system improvements that may adversely affect system costs.

In various embodiments of the present invention, data transmission on the optical data bus occurs or is implemented in two phases or intervals. During a first interval, a pair of independent transmitters sends or transmits data signals on the optical data bus. In particular, each transmitter of the pair transmits its own separate data signal. The transmitted separate data signals each include a data stream or data packet that may be represented by a sequence of data 'bits' nominally identified by or having a binary value arbitrarily designated as being either a '0' or a '1'. For example, a first separate data signal transmitted by a first transmitter of the pair and a second separate data signal transmitted by a second transmitter of the pair may each contain $n_1$ data bits. Note that while described in terms of binary data and equivalently binary bits, the present invention may apply to and therefore explicitly includes any of a variety of higher order data transmission methodologies that employ other than a binary representation of data being transmitted (e.g., a hexadecimal representation). The $n_1$ data bits of the first and second separate data signals are transmitted in a similar number of symbol periods of the optical data bus.

When transmitted on the optical data bus during the first interval, the first and second separate data signals combine together to form a summation signal. That is, the first and second separate data signals do not remain separate once they are transmitted on the optical data bus but combine or sum together as the summation signal. A nature of the combination or summation that results in the summation signal depends, in part, on a modulation defined by or employed with the optical data bus. Herein, the summation signal is a data signal of the optical data bus while the separate data signals are data signals of the transmitters, respectively, before being transmitted on the optical data bus.

For example, employing an on-off keyed (OOK) modulation to produce the first and second separate data signals may result in signal amplitudes or levels of the signals being added to one another on the optical data bus. Specifically, an optical signal having one of three predefined amplitude levels during each symbol period (e.g., a three-level signal) may result when the OOK modulated first and second separate data signals are added together. In another example when a frequency shift keyed (FSK) modulation is used, the summation signal may be characterized by various combinations of the presence or absence of two frequencies $f_1$ and $f_2$ during symbol periods of the summation signal. Specifically, a first frequency $f_1$, a second frequency $f_2$ and a pair of the first and second frequencies, denoted $(f_1, f_2)$, may all be present in various symbol periods. Similarly, a pulse position modulation may exhibit pulses in any of a first position, a second position or both a first and a second position. In yet another example, a binary phase shift keyed (BPSK) modulation may yield a summation signal that exhibits any one of a signal having a non-zero amplitude and a first phase (e.g., $\phi_1=0$ degrees), a signal having a non-zero amplitude and a second phase (e.g., $\phi_1=180$ degrees), and a null signal (e.g., zero amplitude and undetermined phase) during an individual symbol period.

According to various embodiments, the summing or combination of the separate data signals on the optical data bus during the first interval may result in mutual interference between data bits of the first and second separate data signals in at least some symbol periods of the summation signal. In particular, the mutual interference may cause an ambiguous result when received by a receiver. The ambiguous result is referred to herein as a 'bit ambiguity'. In particular, a bit ambiguity is defined as a signal value of or in a symbol period of the summation signal from which it is not possible to determine a value of each of the respective data bits in the separate data signals that were combined to produce the summation signal. In other words, the bit ambiguities largely result from transmission of data bits by the independent transmitter sources, where the value of the data bits cannot be directly determined by examining signal levels, frequencies, or other signal characteristics within the symbol period. In some embodiments, when a binary value of a data bit in the first separate data signal differs from a binary value of a corresponding data bit in the second separate data signal, it is not possible to determine which transmitter is responsible for transmitting which of the different binary values, thus creating a bit ambiguity.

For example, consider a pair of transmitters that employ OOK modulation to transmit their respective separate data signals on the optical data bus in the absence of noise. Further for discussion purposes, assume that when transmitted by respective ones of the transmitters, a binary data bit of value '1' is represented by an amplitude or level of 1.0 in the transmitted signal while a binary data bit of value '0' represents a transmitted level of 0.0. If both transmitters of the pair transmit a '1' during a given symbol period, summation of the signal levels of the two OOK modulated separate data signals will produce a level of 2.0 in the summation signal during the symbol period. Similarly, if both transmitters transmit a '0' during a symbol period, the summation signal will have a level equal to 0.0 during the symbol period. As such, observing, or equivalently receiving, a level of 2.0 during a symbol period means that both transmitters transmitted a '1'. Likewise, receiving a level of 0.0 indicates that both transmitters sent out a '0'. In other words, a received level of 2.0 maps into a transmitted '1' for each transmitter while a received level of 0.0 maps into a '0' for each transmitter, without ambiguity.

However, if one of the transmitters of the example transmitted a '1' during a symbol period in which the other exemplary transmitter transmitted a '0', the symbol period of the summation signal would contain a signal level equal to about 1.0. It may be inferred from receiving a signal level equal to about 1.0 that both a '1' and a '0' were transmitted during the symbol period. However, it is generally not possible to ascertain from the received signal level alone which of the two exemplary transmitters transmitted the '1' and which transmitter transmitted the '0' (e.g., 1+0=1 and 0+1=1). This is a bit ambiguity.

In another example, the pair of exemplary transmitters employs BPSK modulation. When two '1s' or two '0s' are transmitted during a symbol period, the two separate data signals of the pair of transmitters combine to produce a summation signal having an amplitude that is twice an amplitude of the separate data signals and having one of two possible phases. If the summation signal in the bit interval exhibits a first phase (e.g., $\phi=0$ degrees), it can be inferred that two '1s' were transmitted, for example. Similarly, the presence of a second phase in the summation signal bit interval (e.g., $\phi=180$ degrees) indicates that two '0s' were transmitted. However, when either of a '1' and a '0' or a '0' and a '1' are transmitted by the pair of exemplary transmitters, the BPSK modulated signals substantially cancel one another resulting a summation signal during the symbol period with an amplitude that is about zero and has an undetermined phase. While receiving a zero amplitude signal during a symbol period may be interpreted as the pair of transmitters transmitting dissimilar, non-equal or complementary data signals, there is no way to know which of the two exemplary transmitters transmitted the '1' and which transmitted the '0'. Hence, when both a '1' and a '0' are transmitted, the result is a bit ambiguity in the summation signal.

A variety of other modulations yield similar results in which some combination of transmitted binary values during a symbol period yield unambiguous results while other combinations produce bit ambiguities. For example, FSK modulation represented by a pair of frequencies $f_1$ and $f_2$ produces bit ambiguities in a manner similar to the OOK and BPSK modulated examples above. Specifically, when the summation signal includes only one of the two frequencies, it may be inferred that both transmitters transmitted the same binary values (e.g., both '1s' or both '0s'). Moreover, the actual binary value of the transmitted data bits is unambiguously determined by the particular frequency, $f_1$ or $f_2$, that is present during the symbol period. However, a bit ambiguity results when the summation signal includes both $f_1$ and $f_2$ in a symbol period since there is no way of knowing which transmitter transmitted the '1' (e.g., $f_1$) and which transmitted the '0' (e.g., $f_2$). Other modulation types may produce bit ambiguities for different combinations of transmitted binary values in the separate data signals than those discussed above and are within the scope of the embodiments of the present invention.

According to various embodiments of the present invention, the bit ambiguities in the summation signal of the first interval may be resolved using the disambiguation signal. The disambiguation signal is transmitted during the second interval, according to some embodiments. In particular, the disambiguation signal contains information that may establish a value of data bits in the separate data signals for the symbol periods of the summation signal that exhibit bit ambiguities. In some embodiments, the disambiguation signal may comprise signal levels, phases, frequencies or other signal characteristics that represent data bits of or from the separate data signals of one of the first transmitter and the second transmitter for symbol periods of the summation signal that contain bit ambiguities. In these embodiments, bit values in corresponding symbol periods of the separate data signal of the second transmitter, for example, may be computed as a binary complement (e.g., 1→0 and 0→1) of the respective bit values in the disambiguation signal. In other embodiments, the disambiguation signal comprises signal levels, phases, frequencies or other signal characteristics that represent data bits of a combination of the separate data signals in symbol periods of the summation signal that contain bit ambiguities.

For example, if a sequence of data bits in a separate data signal of a first transmitter is given by {1011010} and a sequence of data bits in a separate data signal of a second transmitter is given by {1001100}, an exemplary summation signal may be represented by a data bit sequence {10*1**0} where '*' represents a bit ambiguity. In the example, bit ambiguities are caused by the transmission of data bits having dissimilar values (i.e., a '1' and a '0' or a '0' and a '1'). A disambiguation signal that provides information to resolve the bit ambiguities may comprise a data bit sequence {101}. In this example, the data bits of the exemplary disambiguation signal are data bits of the separate data signal of the first transmitter that correspond to the symbol periods of the summation signal having bit ambiguities.

Given the data bit sequence of the summation signal and the data bit sequence of the disambiguation signal, the data bits of the separate data signal of the first transmitter may be recovered by simply inserting corresponding data bits from the disambiguation signal into appropriate symbol periods of the data bit sequence of the summation signal. In the example above, when bits of the disambiguation signal data bit sequence are inserted into corresponding symbol periods of the summation signal data bit sequence, the data bit sequence of the separate data signal of the first transmitter is recovered (i.e., {10*1**0}←{101}={1011010}). Similarly, if a binary complement is formed of the disambiguation signal's data bit sequence (i.e., $\{101\}^c=\{010\}$), the data bit sequence of the second transmitter's separate data signal may be recovered in an analogous manner (i.e., {10*1**0}←{010}={1001100}).

In some embodiments, the disambiguation signal is formed and then transmitted by only one of the transmitters of the pair acting independently. For example, the first transmitter may receive the summation signal (e.g., from an associated receiver) from the optical data bus, determine locations of the bit ambiguities and then transmit the disambiguation signal. Specifically, the first separate data signal (that is entirely known to the first transmitter) may be used by the first transmitter to extract and recover the second separate data signal or an estimate thereof from the summation signal. The extraction and recovery may employ a subtraction of data bit values of the first separate data signal from data symbol values determined from the summation signal. The data bit values of the second separate data signal may be recovered from the summation signal and first separate data signal by a mapping (e.g., (1, level 2.0)→'1', (0, level 0.0)→'0', etc.), for example. In other words, the subtraction may be performed using data symbol sequences respectively of each of the summation signal and the first separate data signal to yield a data bit sequence of the second separate data signal, for example.

In some embodiments, locations of bit ambiguities may be determined by comparing the recovered second separate data signal to the first separate data signal or equivalently, by comparing respective data bit sequences of the two signals. When a bit ambiguity in the summation signal is the result of dissimilar bits being transmitted during a symbol period, locations of bit ambiguities in the summation signal may be determined by noting the location of the dissimilarities, for example. For other forms of bit ambiguities, other criteria for identifying the bit ambiguities may be used. For example, when the exemplary OOK modulation embodiment described above is employed, reception of a signal having a level of about 1.0 may be an indication of a bit ambiguity. After locating bit ambiguities, the first transmitter forms and transmits the disambiguation signal by simply selecting and transmitting appropriate data bits from either of the first separate data signal or the recovered second separate data signal.

In other embodiments, the disambiguation signal is produced by a combination of the transmitters of the pair acting cooperatively. For example, both of the first transmitter and the second transmitter may receive the summation signal, determine locations of bit ambiguities and then cooperatively transmit signals that combine in the optical data bus to form the disambiguation signal. In some embodiments, the first and second transmitters may create a combined signal on the optical data bus that employs ternary symbols. In particular, when the optical data bus employs a modulation such as OOK, the three signal levels available to the pair of transmitters (i.e., 0.0, 1.0 and 2.0) may be employed to encode the disambiguation signal using ternary symbols mapped onto the available three-level signal. Employing such a ternary symbol mapping may further improve throughput, in some embodiments. In particular, a disambiguation signal of length $n_2$ may be encoded as a sequence of length of about $n_2/\log_2 3$ using ternary symbols and an associated mapping.

In other embodiments, one or more of determining locations of the bit ambiguities and transmitting the disambiguation signal may be performed by other than the first transmitter and the second transmitter. For example, a separate transceiver may receive the summation signal and one or both of the first separate data signal and the second separate data signal from respective ones of the pair of transmitters. The separate transceiver may then form and transmit the disambiguation signal. Various combinations of any of the above are also possible.

Herein and according to various embodiments, the optical data bus comprises an optical channel that carries an optical signal. In particular, the optical channel interconnects modules or elements on (i.e., connected to) the optical data bus. Modules on the optical data bus may include, but are not limited to, transmitters that generate and transmit data signals over the optical channel of the optical data bus and receivers that receive the data signals. A transmitter may be combined with a receiver to produce a transceiver. In general, the modules may communicate with one another by transmitting the optical signal to either one other module or more than one other module connected to the optical data bus. Thus, the optical data bus described herein includes, but is not limited to, point-to-point, multi-drop, and star network bus architectures. Further, the optical data bus includes an optical channel that may employ one or both of free space optical signals (i.e., substantially unguided optical signals) and optical signals that are substantially guided by or within a physical channel.

The guided optical signals may be conducted or guided on or within an optical waveguide, for example.

In some embodiments, the optical data bus may comprise an uplink channel or upstream optical waveguide and a downlink channel or downstream optical waveguide. The upstream optical waveguide may be interconnected to the downstream optical waveguide by a repeater, for example. In such an exemplary multi-drop architecture, transmitters are generally connected to the upstream waveguide while receivers are generally connected to the downstream optical waveguide.

As used herein, data in the form of data bits or data symbols are associated with or occupy symbol periods of the optical data bus or equivalently, symbol periods of signals on the optical data bus. In general, a symbol period is defined as a segment or period of time on the optical data bus during which a data bit or symbol is transmitted or equivalently during which the data is received. In some embodiments, the data symbol is represented by a binary data bit while in other embodiments, the data symbol may be a higher order symbol (e.g., a ternary symbol) that represents a plurality of data bits. Symbol periods may be associated with or determined by a clock signal of the optical data bus, according to some embodiments. For example, a symbol period may begin on a transition of a clock signal. In another example, a symbol period may be a period that includes a clock transition (e.g., is centered on a clock transition). In some embodiments, the clock signal is a separate signal while in other embodiments, the clock signal is embedded in a data signal of the optical data bus (e.g., the clock signal may be recovered from the data signal of the optical data bus). Symbol periods are also defined for data signals that are transmitted by the transmitters on the optical bus. However, no distinction is made between transmitter data signal symbol periods and symbol periods of the optical bus since the transmitter data signals are transmitted on and thus conform to the clock or other symbol period defining mechanism of the optical bus.

Herein an interval is explicitly defined as a time interval. For example, an interval may be a time slot of a time division multiple access (TDMA) mode of the optical data bus. Further as used herein, the first interval and the second interval need not be sequential. However, generally the first interval precedes the second interval in time. Each of the first interval and the second interval contain a plurality of symbol periods. In some embodiments, the second interval is shorter than and includes fewer symbol periods than the first interval.

Further, as used herein, the article 'a' is intended to have its ordinary meaning in the patent arts, namely 'one or more'. For example, 'a bit ambiguity' means one or more bit ambiguities and as such, 'the bit ambiguity' explicitly means 'the bit ambiguity(ies)' herein. Also, any reference herein to 'top', 'bottom', 'upper', 'lower', 'up', 'down', 'front', back', 'left' or 'right' is not intended to be a limitation herein. Herein, the term 'about' when applied to a value generally means plus or minus 10% unless otherwise expressly specified. Moreover, examples herein are intended to be illustrative only and are presented for discussion purposes and not by way of limitation.

Figure 1:
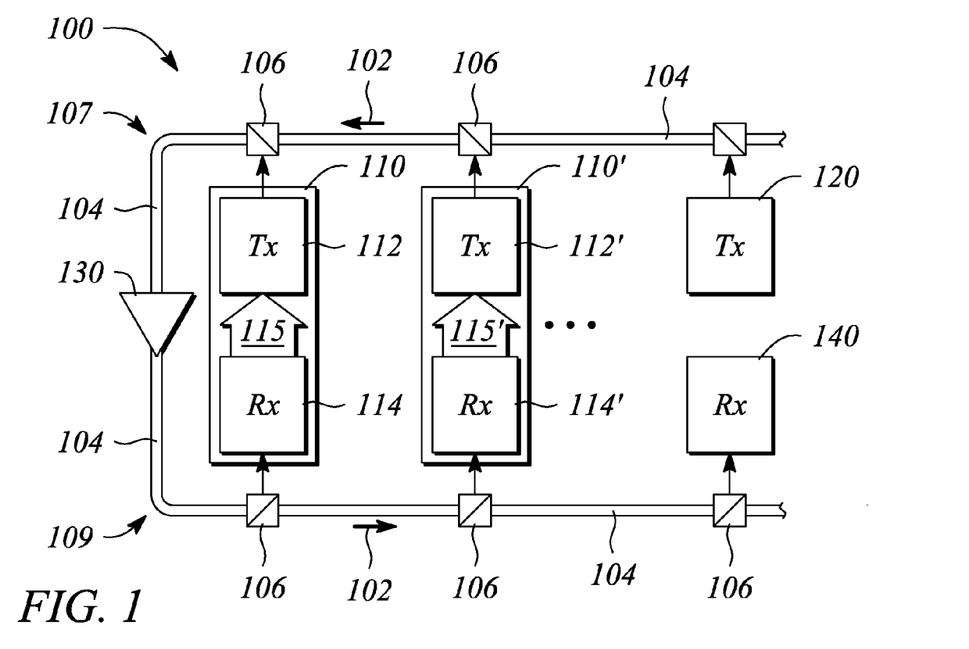
FIG. 1 illustrates a block diagram of an optical data bus system, according to an embodiment of the present invention.

FIG. 1 illustrates a block diagram of an optical data bus system 100, according to an embodiment of the present invention. The optical data bus system 100 comprises a plurality of elements or modules that communicate with one another using an optical signal 102 carried between modules by an optical bus 104. For example, the optical bus 104 may comprise free space such that the optical signal 102 is communicated from one module to another by a line of sight, free space optical data link. In another example, the optical bus 104 may comprise a fiber optic interconnect (e.g., fiber optic cable or line). The fiber optic interconnect may comprise a plurality of optical couplers 106, for example. In some of embodiments, the optical couplers 106 may be substantially similar to one another while in other embodiments, the optical couplers 106 may differ from one another in one or more operational characteristics. In yet another example, the optical bus 104 may comprise an optical star coupler.

The optical data bus system 100 comprises an optical data bus transceiver 110. The optical data bus transceiver 110 comprises a transmitter 112 connected to the optical bus 104. The transmitter 112 is configured, in conjunction with another transmitter, to produce on the optical bus 104 a summation signal during a first interval and a disambiguation signal during a second interval. In some embodiments, the other transmitter is a transmitter 112' of another optical bus transceiver 110'. The other transceiver 110' may be substantially similar to the optical data bus transceiver 110, for example. In some of these embodiments, there may be a plurality of other optical bus transceivers 110' as indicated by ellipses in FIG. 1. In other embodiments, the other transmitter is a separate transmitter 120 connected to the optical bus 104 that is not part of another transceiver. Herein, the other transmitter is referred to as the other transmitter 112', 120 to mean either transmitter 112' or transmitter 120.

The summation signal comprises a summation of separate data signals of each of the transmitter 112 and the other transmitter 112', 120. The disambiguation signal comprises information to resolve bit ambiguities in the summation signal. In particular, the information facilitates resolving a bit ambiguity in the summation signal resulting from a summation of data bits in each of the respective separate data signals during a symbol period of the first interval. In some embodiments, the transmitter 112 of the optical data bus transceiver 110 along with the other transmitter 112', 120 are both configured to cooperatively produce the disambiguation signal during the second interval.

For example, when OOK modulation is employed, the transmitter 112 and the other transmitter 112', 120 may cooperate to generate a three-level signal and encode the disambiguation signal using the three levels available. To transmit a first level or 0-level of the three-level signal, the transmitter 112 and the other transmitter 112', 120 may cooperatively transmit a '0', for example. Similarly, a second or 2-level may be provided by the transmitter 112 and the other transmitter 112', 120 each cooperatively transmitting a '1' such that the transmitted signals sum together to produce a signal level having twice the amplitude of the signals transmitted by each of the transmitters 112, 112' or 120 (e.g., a 2-level). A third or intermediate level (e.g., a 1-level) may be generated by the transmitter 112 transmitting either a '1' or a '0' when the other transmitter 112', 120 cooperatively transmits either a '0' or a '1', for example.

The transmitter 112 (and by extension the other transmitter 112', 120) may comprise a laser, for example. In another example, the transmitter 112 may comprise a light emitting diode (LED). In some embodiments, an optical signal of the transmitter 112 may be coupled to the optical bus by the optical coupler 106. As illustrated, the transmitter 112 and the other transmitter 112', 120 are both connected to an upstream portion 107 of the optical data bus 104 using separate optical couplers 106. In some embodiments, the optical couplers 106 may comprise a beam splitter that directs an output signal of the transmitter in a particular direction along the upstream portion 107 of the optical bus 104. As noted above, various ones of the optical couplers 106 may have differing performance characteristics. For example, optical couplers 106 at different locations along the optical bus 104 may have different coupling values such that a signal reaching a receiver on the optical bus 104 has substantially the same power level regardless of which transmitter on the bus actually produced the signal.

In some embodiments, reception of the summation signal is provided by a receiver. In particular, in some embodiments, the optical data bus transceiver 110 further comprises a receiver 114 that is configured to receive the summation signal. The receiver 114 is further configured to communicate the received summation signal or a binary representation of the received summation signal to the transmitter 112, according to some embodiments. A data path 115, as illustrated, indicates communication between the receiver 114 and the transmitter 112. The receiver 114 may comprise an optical detector (e.g., optical diode), for example. The other transceiver(s) 110' may similarly comprise a receiver 114' and data path 115' that are substantially similar to the receiver 114 and data path 115, respectively, of the transceiver 110, according to some embodiments In some embodiments, the optical data bus transceiver 110 is configured to also receive (e.g., using receiver 114) the summation signal and subtract from the summation signal the separate data signal of the optical data bus transceiver transmitter 112. In particular, the subtraction may be performed using data sequences that represent data of the summation signal and the separate data signal of the optical data bus transceiver 110. The subtraction regenerates the separate data signal of the other transmitter 112', 120 to enable production of the disambiguation signal, according to some embodiments. In some embodiments, the disambiguation signal comprises data bits of one of the separate data signals corresponding to symbol periods of the first interval in which bit ambiguities are located. For example, the disambiguation signal may comprise data bits of the separate data signal of the optical data bus transceiver 110. In some embodiments, the other transceiver(s) 110' may also be configured to perform subtraction of the separate data signal of transmitter 112' from a received summation signal to determine the separate data signal of transmitter 112.

As illustrated, the receiver 114 is connected to the optical data bus by another optical coupler 106 in a downstream portion 109 of the optical data bus 104 and is configured to receive the summation signal. Further as illustrated, a repeater 130 connects the upstream portion 107 of the optical data bus to the downstream portion 109.

In some embodiments, the optical data bus system 100 further comprises a receiver 140 that is an intended recipient of one or both of the separate data signals of the transmitter 112 and other transmitter 112', 120. In some embodiments, the receiver 140 is separate from a transceiver 110, 110', as illustrated. In other embodiments, the receiver 140 may be a receiver 114' of another transceiver 110'. For example, the receiver 140 may be a receiver 114' of another transceiver 110' that is not transmitting one of the separate data signals.

The receiver 140 may be connected to the optical data bus 104 with another optical coupler 106 connected to the downstream portion 109, as illustrated. The receiver 140 is configured to receive the summation signal during the first interval and the disambiguation signal during the second interval. In some embodiments, the receiver 140 is further configured to resolve the bit ambiguities present in the summation signal using the information provided by the disambiguation signal. Resolving bit ambiguities may facilitate recovery of one or both the first data signal and the second data signal from the summation signal using the provided information.

Figure 2A:
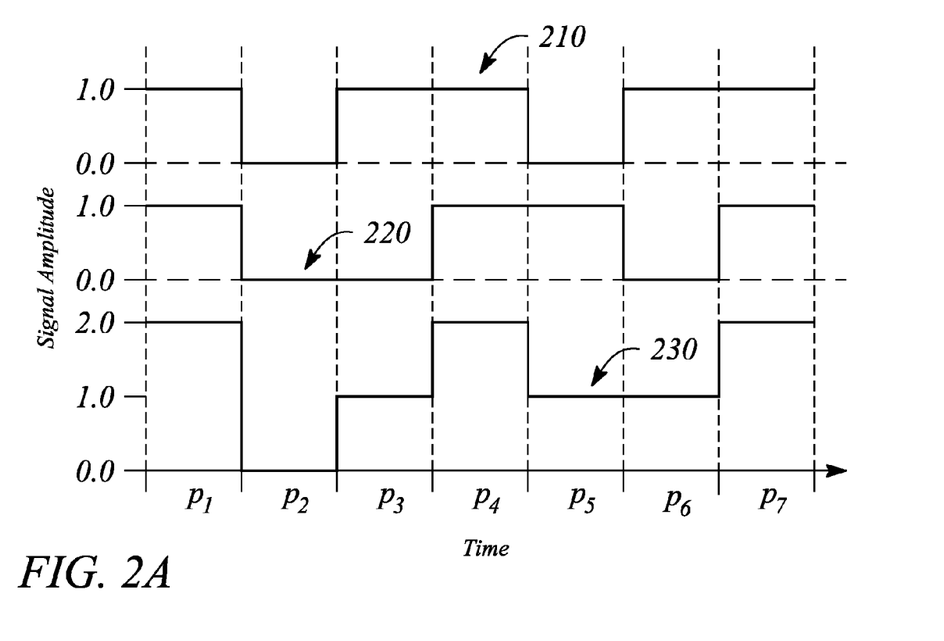
FIG. 2A illustrates a graph of waveforms representative of signals transmitted on an optical data bus, according to an embodiment of the present invention.

FIG. 2A illustrates a graph of waveforms representative of signals transmitted on an optical data bus, according to an embodiment of the present invention. In particular, two waveforms 210, 220 illustrated in FIG. 2A are indicative of a signal having an on-off keyed (OOK) modulation coded according to a non-return to zero (NRZ) coding. The NRZ coding illustrated in FIG. 2A is sometimes referred to as an NRZ-level coding or equivalently an NRZ-L coding. A first waveform 210 illustrated in FIG. 2A represents an arbitrary sequence of data bits, namely a sequence {1011011}, in a plurality of symbol periods of a first signal. The first waveform 210 may be representative of a first separate data signal transmitted by a first transmitter, for example. A second waveform 220 illustrated in FIG. 2A represents an arbitrary sequence of bits, namely a sequence {1001101}, in a plurality of corresponding symbol periods of a second signal. The second waveform 220 may be representative of a second separate data signal transmitted by a second transmitter on the optical data bus, for example. In FIG. 2A, symbol periods are indicated or separated by vertical dashed lines and are labeled as $p_1$, $p_2$, $p_3$, ... $p_7$.

FIG. 2A further illustrates a waveform 230 representing a summation signal resulting from a summation of the first and second signals represented by the pair of waveforms 210, 220. As illustrated, signal levels represented by the waveforms 210, 220 add together linearly to yield signal levels represented by the summation signal waveform 230. In particular, during a first symbol period $p_1$ (and periods $p_4$ and $p_7$), two '1s' in the respective waveforms 210 and 220 have added together to produce a level 2.0 in the summation signal waveform 230. Symbol periods $p_3$, $p_5$ and $p_6$ contain bit ambiguities indicated by waveform levels of 1.0, as illustrated.

Figure 2B:
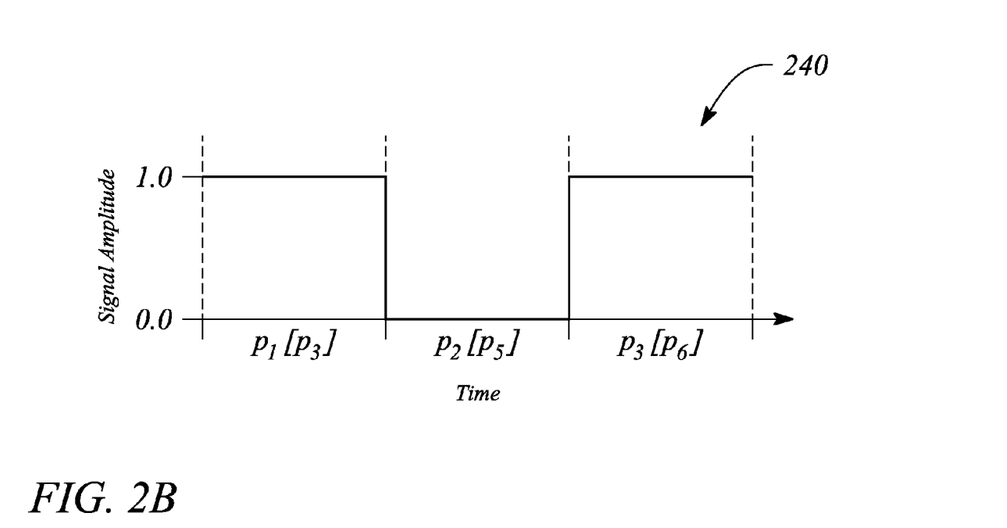
FIG. 2B illustrates a waveform representing a disambiguation signal for a summation signal illustrated in FIG. 2A, according to an embodiment of the present invention.

FIG. 2B illustrates a waveform 240 representing a disambiguation signal for the summation signal illustrated in FIG. 2A, according to an embodiment of the present invention. In particular, the waveform 240 illustrated in FIG. 2B may be produced by selecting data bits represented by levels in the first waveform 210 corresponding to symbol periods $p_3$, $p_5$ and $p_6$, namely a bit sequence {101}. Symbol periods $p_1$, $p_2$ and $p_3$ of the disambiguation signal correspond to symbol periods $p_3$, $p_5$ and $p_6$, illustrated by the brackets '[•]' in FIG. 2B. The disambiguation signal resolves the bit ambiguity in the summation signal at symbol periods $p_3$, $p_5$ and $p_6$.

Figure 2C:
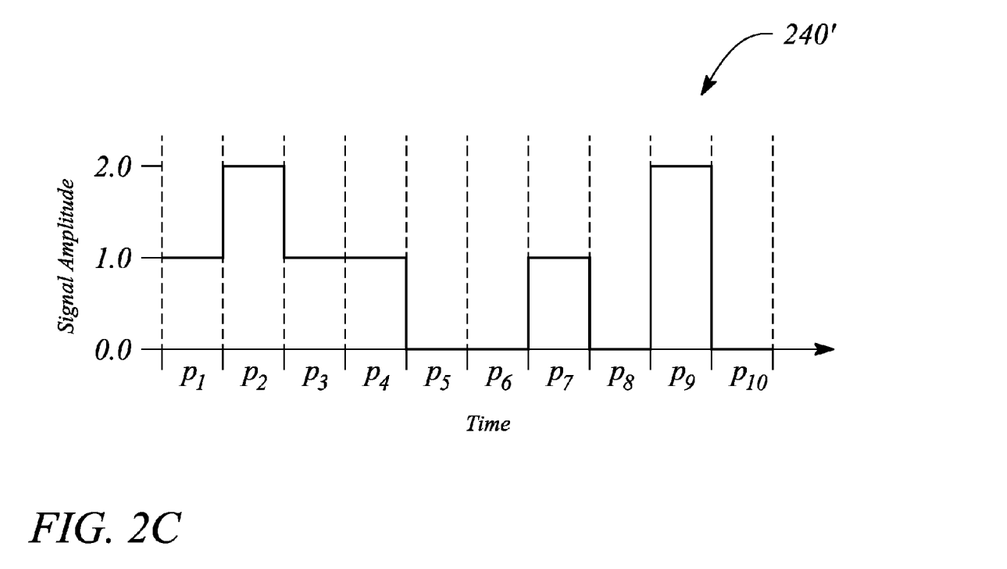
FIG. 2C illustrates a waveform representing a disambiguation signal, according to another embodiment of the present invention.

FIG. 2C illustrates a waveform 240' representing a disambiguation signal, according to another embodiment of the present invention. In particular, illustrated in FIG. 2C is a waveform of a three-level signal created by a pair of transmitters cooperating to transmit a disambiguation signal. The waveform 240' illustrated in FIG. 2C comprises a data sequence {101100000011110} where 3-tuples of data symbols from the data sequence are mapped into ternary symbols represented by pairs of the three levels of the three-level waveform 240'. An arbitrary mapping listed below is employed where a symbol {2,1} is not used.

{000}→{0,0}
{001}→{0,1}
{010}→{0,2}
{011}→{1,0}
{100}→{1,1}
{101}→{1,2}
{110}→{2,0}
{111}→{2,2}

The corresponding three-level disambiguation signal after applying the mapping is given in terms of the three levels as a sequence {1,2,1,1,0,0,1,0,2,0} (e.g., see waveform 240' illustrated in FIG. 2C). Note that the waveform 240' and equivalently the sequence corresponding to the three-level disambiguation signal require fewer symbol periods (i.e., is shorter) than the data bit sequence that originally defined the disambiguation signal in terms of binary bits (i.e., the sequence {1,2,1,1,0,0,1,0,2,0} requires only 10 symbol periods to encode a disambiguation signal having 15 symbol periods). As such, using the three-level disambiguation signal may further improve throughput.

Figure 3:
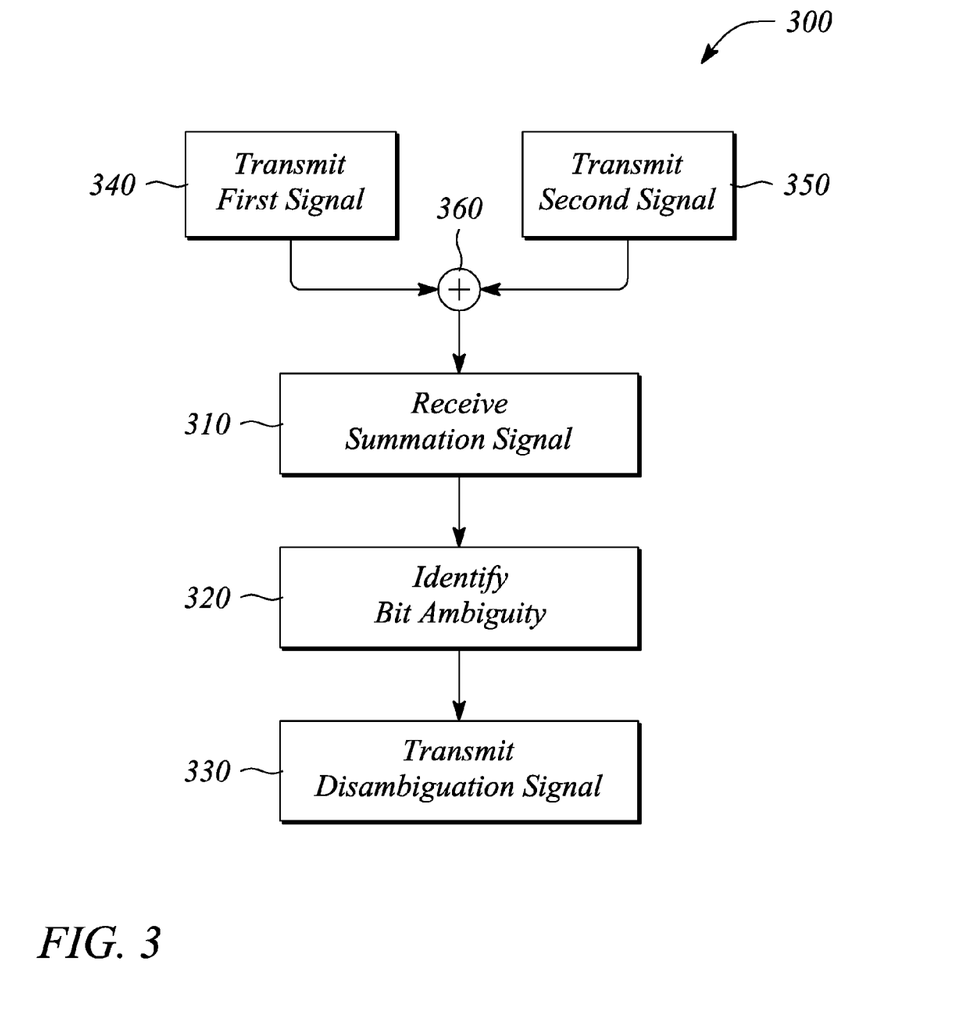
FIG. 3 illustrates a flow chart of a method of resolving bit ambiguities in data transmitted on an optical bus, according to an embodiment of the present invention.

FIG. 3 illustrates a flow chart of a method 300 of resolving bit ambiguities in data transmitted on an optical data bus, according to an embodiment of the present invention. The method 300 of resolving bit ambiguities may be employed to increase data throughput in the optical data bus, for example. In particular, the method 300 of resolving bit ambiguities may facilitate communication by a pair of transmitters connected to the optical data bus. One or both of the pair of transmitters may be part of a transceiver that further includes a receiver that is also connected to the optical bus. Alternatively, one or both of the transmitters and receivers may be stand-alone elements of the optical data bus. In some embodiments, the transmitters, receivers, and other elements of the optical bus may be software controlled and the method may be implemented as a computer program that, when executed, provides the software control to the optical bus elements.

The method 300 of resolving bit ambiguities comprises receiving 310 a summation signal from the optical bus during a first interval. The received summation signal comprises a first data signal added to a second data signal. In some embodiments, a first transmitter and a second transmitter separately provide the first and second signals, respectively. For example, the first transmitter may be the transmitter 112 of the optical data bus transceiver 110, described above. Similarly, the second transmitter may be either another transmitter 112 of another optical data bus transceiver 110 or the other transmitter 120 described above with respect to the optical data bus system 100, for example.

The method 300 of resolving bit ambiguities further comprises identifying 320 a bit ambiguity in the summation signal. As above, a bit ambiguity may result from interference between respective data bits in the first and second signals during a symbol period of the first interval, according to some embodiments. For example, the bit ambiguity may be a result of a data bit of the first signal having a different value than a data bit of the second signal during the same symbol period.

The method 300 of resolving bit ambiguities further comprises transmitting 330 a disambiguation signal during a second interval. The transmitted disambiguation signal comprises information to resolve the identified 320 bit ambiguity in the summation signal. In some embodiments, the disambiguation signal is transmitted 330 cooperatively by a combination of the first and second transmitters. For example, the disambiguation signal may be cooperatively transmitted 330 using a 3-level signal, as described above.

In some embodiments, the method 300 of resolving bit ambiguities further comprises transmitting 340 the first signal. In some of these embodiments, transmitting 340 the first signal employs the first transmitter connected to the optical bus. In some embodiments, the first transmitter may use a binary on-off keyed (OOK), non-return to zero (NRZ) modulation. In some embodiments, the method 300 of resolving bit ambiguities further comprises transmitting 350 the second signal. In some of these embodiments, transmitting 350 the second signal employs the second transmitter connected to the optical bus. In some embodiments, the second transmitter also uses the binary OOK NRZ modulation. In these embodiments, the summation signal comprises data symbols in respective symbol periods of the first interval where the data symbols are represented by a three-level signal produced by the summation of binary signal levels respectively of the first signal and the second signal on the optical bus within the symbol periods of the first interval. The transmitted 340 first signal and the transmitted 350 second signal add 360 together in the optical bus to form the summation signal that is received 310.

In other embodiments, the first transmitter and the second transmitter may use any of a number of other modulations including, but not limited to, other OOK modulations, binary phase shift keyed (BPSK) modulation and frequency shift keyed (FSK) modulation. In these embodiments, the summation signal may or may not be represented by a three-level signal. For example, with FSK modulation, the signal may have any of three different frequency spectra rather than three signal levels.

In some embodiments, such as when the binary OOK NRZ modulation is employed, identifying 320 a bit ambiguity comprises receiving a predetermined one of the levels of the three-level signal. In some embodiments, a receiver associated with one or both of the first transmitter and the second transmitter receives the predetermined one of the levels. For example, the predetermined level that identifies a bit ambiguity may be an intermediate level created by summing a '1' transmitted by the first transmitter and a '0' transmitted by the second transmitter to form the summation signal. The intermediate level may have an arbitrary amplitude value of 1.0 where two other levels of the three-level signal may have respective arbitrary amplitude levels of 0.0 and 2.0, for example. In other embodiments, such as when FSK modulation is employed, receiving a summation signal having two frequencies during a symbol period may identify a bit ambiguity.

In some embodiments (not illustrated), the method 300 of resolving bit ambiguities further comprises comparing the received summation signal to one or both of the first signal and the second signal to regenerate a respective other one or both of the second signal and the first signal from the summation signal. The regenerated one of the second signal and the first signal is recovered from the received summation signal by the comparison. In these embodiments, transmitting 330 the disambiguation signal employs bit values from the regenerated signal during symbol periods corresponding to the one or more identified bit ambiguities.

In some embodiments (not illustrated), the method 300 of resolving bit ambiguities further comprises receiving both of the summation signal during the first interval and the disambiguation signal during the second interval using a receiver connected to the optical data bus. In some embodiments, the receiver that receives the summation signal and the disambiguation signal is a module that is an intended recipient of one or both of the first signal and the second signal.

It should be noted that noise and the effect of noise on signal integrity at a receiver are ignored herein. Additional coding (e.g., various retransmission techniques, cyclic redundancy check or 'CRC' codes, and various other error detection and correction codes) may be employed in addition to the summation signal and disambiguation signal described herein to deal with noise and the effect of noise, for example.

Thus, there have been described embodiments of an optical data bus transceiver and an optical data bus system as well as a method of resolving bit ambiguities that employ a disambiguation signal to resolve bit ambiguities in a summation signal on an optical data bus. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. An optical data bus transceiver (110) comprising:
a transmitter (112) connected to an optical bus (104) and configured, in conjunction with another transmitter (112', 120), to produce on the optical bus (104) a summation signal during a first interval and a disambiguation signal during a second interval; and
a receiver (114) configured to receive the summation signal,
wherein the summation signal comprises a summation of separate data signals from each of the transceiver transmitter (112) and the other transmitter (112', 120), and wherein the disambiguation signal comprises information to resolve bit ambiguities in the summation signal, a bit ambiguity resulting from a summation of data bits in each of the respective data signals during a symbol period of the first interval.

2. The optical data bus transceiver (110) of claim 1, wherein the transceiver transmitter (112) and the other transmitter (112', 120) are configured to cooperatively produce the disambiguation signal during the second interval.

3. The optical data bus transceiver (110) of claim 1, wherein the optical data bus transceiver (110) is configured to subtract from the summation signal the separate data signal of the optical data bus transceiver transmitter (112), the subtraction regenerating the separate data signal of the other transmitter (112', 120) to enable production of the disambiguation signal.

4. The optical data bus transceiver (110) of claim 1, wherein the disambiguation signal comprises data bits of one of the separate data signals corresponding to symbol periods of the first interval in which bit ambiguities are located.

5. The optical data bus transceiver (110) of claim 1, wherein the summation signal is a three-level signal comprising:
a first level of the three-level signal representing transmission of a binary zero in both of the separate data signals during a symbol period;
a second level of the three-level signal representing transmission of a binary one in both of the separate data signals during the symbol period; and
a third level of the three level signal representing transmission during the symbol period of either (a) a binary one in the data signal of the transceiver transmitter (112) and a binary zero in the data signal of the other transmitter (112', 120), or (b) a binary zero in the data signal of the transceiver transmitter (112) and a binary one in the data signal of the other transmitter (112', 120).

6. The optical data bus transceiver (110) of claim 5, wherein the disambiguation signal is a three level signal, the information of the disambiguation signal being encoded using ternary symbols that employ all three levels of the three level signal, and wherein the three level signal is a product of the transceiver transmitter (112) in acting in cooperation with the other transmitter (112', 120).

7. The optical data bus transceiver (110) of claim 1, wherein the optical bus (104) is configured to operate in a time division multiple access (TDMA) mode, the first interval being a first TDMA time slot and the second interval being a second TDMA time slot, and wherein the separate data signals comprise binary on-off keyed modulation with non-return to zero coding signals respectively produced by the transceiver transmitter (112) and the other transmitter (112', 120) and provided to the optical bus (104).

8. An optical data bus system (100) comprising:
a first transmitter (112) configured to provide a first data signal to a data channel during a first interval;
a second transmitter (112', 120) configured to provide a second data signal to the data channel during the first interval, the first data signal and the second data signal producing a summation signal by adding bit-wise to one another within the data channel; and
means for providing a disambiguation signal on the data channel during a second interval, the disambiguation signal providing information to resolve bit ambiguities present in the summation signal at a receiver (114, 114', 140).

9. The optical data bus system (100) of claim 8, wherein the means for providing a disambiguation signal comprises one or both of the first transmitter (112) and the second transmitter (112', 120) configured to receive a summation of the first data signal and the second data signal from the data channel, the disambiguation signal being generated from a difference between the received summation signal and one of the first data signal and the second data signal.

10. The optical data bus system (100) of claim 8, further comprising the receiver (114, 114', 140) configured to receive the summation signal during the first interval and the disambiguation signal during the second interval, wherein the receiver (114, 114', 140) is further configured to resolve the bit ambiguities present in the summation signal using the information provided by the disambiguation signal, wherein resolved bit ambiguities facilitate recovery of one or both the first data signal and the second data signal from the summation signal using the provided information.

11. The optical data bus system (100) of claim 8, further comprising an optical data bus (104) having an upstream (107) optical waveguide and a downstream (109) optical waveguide, the first transmitter (112) and the second transmitter (112', 120) being connected to the upstream (107) optical waveguide and the receiver (114, 114', 140) being connected to the downstream (109) optical waveguide.

12. A method (300) of resolving bit ambiguities in data transmitted on an optical bus, the method (300) comprising:
receiving (310) a summation signal from the optical bus during a first interval, the received summation signal comprising a first signal added to a second signal from respective separate transmitters;
identifying (320) a bit ambiguity in the summation signal, a bit ambiguity resulting from an interference between respective data bits of the first signal and the second signal during a symbol period of the first interval; and
transmitting (330) a disambiguation signal during a second interval, the disambiguation signal comprising information to resolve the identified bit ambiguity in the summation signal.

13. The method (300) of resolving bit ambiguities of claim 12, further comprising:
transmitting (340) the first signal from a first transmitter connected to the optical bus, the first transmitter using a binary on-off keyed (OOK), non-return to zero (NRZ) modulation; and
transmitting (350) the second signal from a second transmitter connected to the optical bus, the second transmitter using the binary OOK NRZ modulation,
wherein the summation signal comprises data symbols in respective symbol periods of the first interval, the data symbols being represented by a three-level signal produced by the summation of binary signal levels respectively of the first signal and the second signal on the optical bus within the symbol periods of the first interval, and wherein identifying (320) a bit ambiguity comprises receiving a predetermined one of the levels of the three-level signal.

14. The method (300) of resolving bit ambiguities of claim 12, the method further comprising:
- comparing the received summation signal to one of the first signal and the second signal to respectively regenerate the second signal or the first signal,
- wherein transmitting (330) the disambiguation signal employs bit values from one or both of the regenerated second signal and the regenerated first signal at symbol periods corresponding to one or more identified bit ambiguities.

15. The method (300) of resolving bit ambiguities of claim 12, further comprising:
- receiving both of the summation signal during the first interval and the disambiguation signal during the second interval with a receiver, wherein the disambiguation signal is used to correct bit ambiguities in the summation signal and facilitate recovery of one or both of the first signal and the second signal from the summation signal.

* * * * *